United States Patent
Hatagishi et al.

(10) Patent No.: US 6,416,700 B1
(45) Date of Patent: Jul. 9, 2002

(54) METHOD OF PRODUCING RESIN-MOLDED ASSEMBLY AND METHOD PRODUCING DOUBLE-RETAINING CONNECTOR

(75) Inventors: Yuji Hatagishi; Teruhisa Norizuki, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/335,872

(22) Filed: Jun. 18, 1999

Related U.S. Application Data (63) Continuation-in-part of application No. 08/964,225, filed on Nov. 4, 1997, now abandoned.

(30) Foreign Application Priority Data

Nov. 27, 1996 (JP) ............................................... 8-316542

(51) Int. Cl.⁷ .......................... B29C 45/14; B29C 65/66; B29C 65/70
(52) U.S. Cl. ...................... 264/242; 264/255; 264/264; 439/596
(58) Field of Search ................................. 264/242, 264, 264/250, 249, 294, 295, 255, 268; 439/165, 596

(56) References Cited

U.S. PATENT DOCUMENTS

| | | | |
|---|---|---|---|
| 3,443,005 A | 5/1969 | Braun | 264/242 |
| 3,456,913 A | 7/1969 | Lutz | 264/242 |
| 3,941,495 A | 3/1976 | Duncan | 264/242 |
| 3,978,189 A * | 8/1976 | Einhorn | 264/242 |
| 4,890,356 A * | 1/1990 | Czech et al. | 264/242 |
| 5,190,501 A | 3/1993 | Schwerdhoefer | 264/242 |
| 5,298,215 A * | 3/1994 | Krause | 264/264 |
| 5,480,324 A * | 1/1996 | Maegawa et al. | 439/489 |
| 5,647,777 A * | 7/1997 | Sasai et al. | 439/752 |
| 5,759,066 A * | 6/1998 | Okabe | 439/598 |
| 5,871,374 A * | 2/1999 | Maney | 439/596 |
| 5,921,806 A * | 7/1999 | Shuey | 439/464 |
| 6,027,374 A * | 2/2000 | Nagai et al. | 439/596 |
| 6,056,569 A * | 5/2000 | Nakamura | 439/189 |
| 6,109,975 A * | 8/2000 | Nitta | 439/686 |
| 6,179,670 B1 * | 1/2001 | Sugiyama | 439/701 |

FOREIGN PATENT DOCUMENTS

| | | |
|---|---|---|
| JP | 5-226025 | 9/1993 |
| JP | 6-293042 A | 3/1995 |
| JP | 7-312255 | 11/1995 |
| JP | 8-216296 A | 8/1996 |
| JP | 9-317299 A | 12/1997 |

* cited by examiner

*Primary Examiner*—Angela Ortiz
(74) *Attorney, Agent, or Firm*—Sughrue Mion, PLLC (57) ABSTRACT

A method of producing a resin-molded assembly and a method of producing a double-retaining connector in which the need for an assembling operation of resin-molded products connected together by pins is obviated, and also a molding process is shortened so as to reduce the production cost. Resin materials, used respectively for the molded products, are so selected that a shrinkage coefficient of the first molded product 21, having engagement pins 21b, can be higher than that of the second molded product having fitting holes 22c, and the first and second molded products are molded integrally with each other in an assembled condition by a multicolor molding method.

18 Claims, 7 Drawing Sheets

FIG.1

PRIOR ART

FIG.2

PRIOR ART

METHOD OF PRODUCING RESIN-MOLDED ASSEMBLY AND METHOD PRODUCING DOUBLE-RETAINING CONNECTOR

CROSS REFERENCE TO RELATED APPLICATIONS

This is a Continuation-In-Part of prior application Ser. No.: 08/964,225 filed on Nov. 4, 1997, now abandoned.

BACKGROUND OF THE INVENTION

This invention relates to a method of producing a resin-molded assembly and a method of producing a double-retaining connector, in which the need for an assembling operation of resin-molded products connected together by pins is obviated, and also a molding process thereof is shortened so as to reduce the production cost.

In a conventional resin-molded connector used for connection of electric wiring, it is a common practice to mold or form elastic retaining piece portions (so called lances) integrally on a housing which retaining piece portions are engaged respectively with connection terminals, inserted into the housing of a resin, thereby preventing the connection terminals from being disengaged.

However, a connector, used in electric wiring of a vehicle, is subjected to vibrations and so on during the travel of the vehicle, and therefore there have been extensively used connectors in which a double-retaining member for locking the engagement condition by the elastic retaining piece portions is added so as to prevent the elastic retaining piece portions from being disengaged respectively from the connection terminals.

FIGS. 1 to 4 shows one conventional double-retaining connector.

This double-retaining connector 1 is disclosed in Japanese Patent Unexamined Publication No. Hei. 5-226025, and comprises a housing body 5 of a generally box-shape having elastic retaining piece portions (lances) 4 formed respectively in terminal receiving holes 2 so as to retain connection terminals 3 inserted respectively into the terminal receiving holes 2, a double-retaining member 7 for locking the engagement condition by the elastic retaining piece portions 4, and hinge bands 8 which connects the double-retaining member 7 to the housing body 5 in such a manner that the double-retaining member 7 can be shifted or moved into a locked condition. This double-retaining connector is formed into an integrally-molded construction, using a synthetic resin. Each of the hinge bands 8 defines a narrow band with high flexibility.

Figure 1:
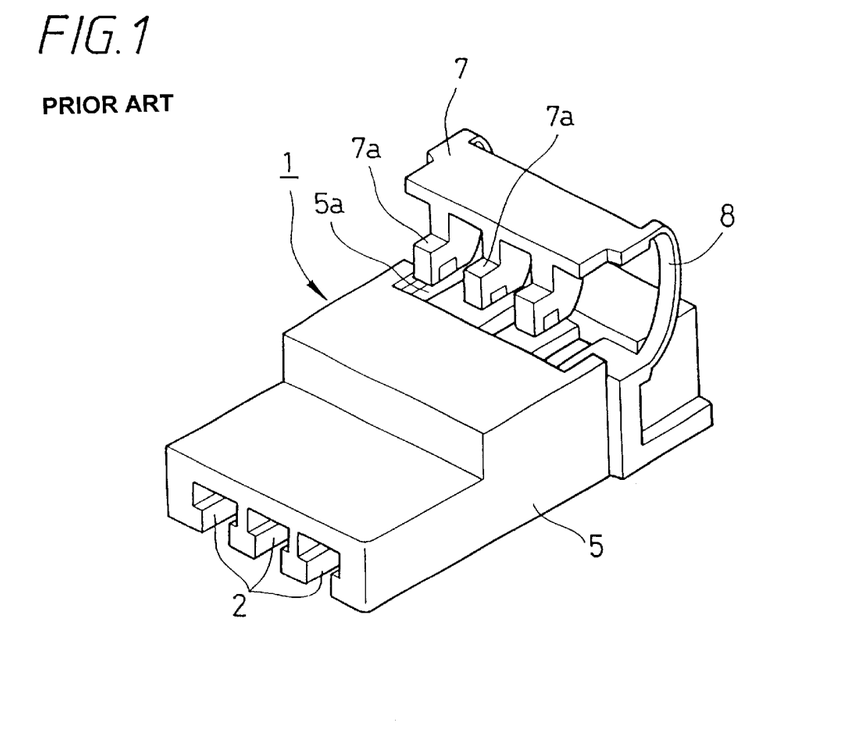
FIG. 1 is a perspective view showing a conventional double-retaining connector.
Figure 2:
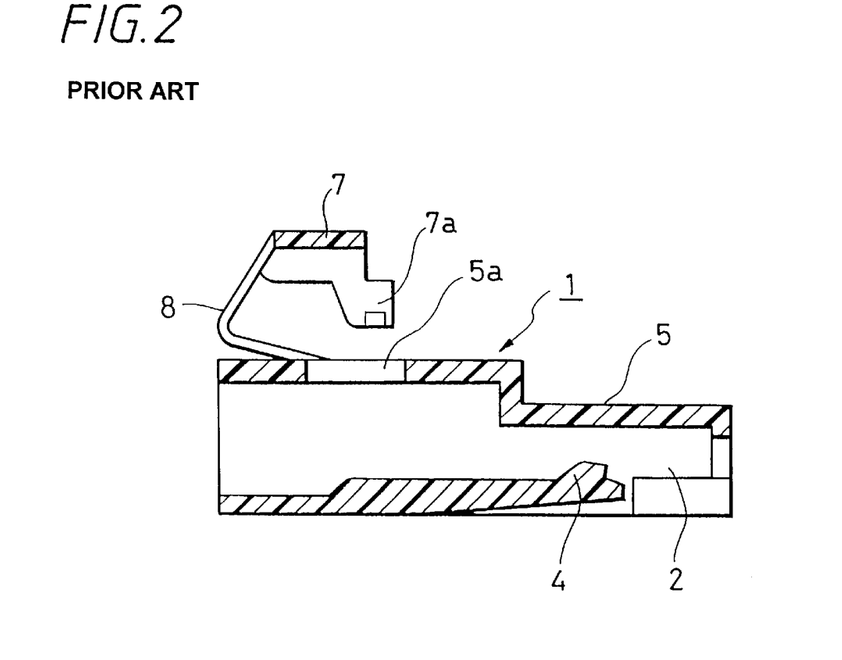
FIG. 2 is a vertical cross-sectional view of the double-retaining connector of FIG. 1 before the insertion of connection terminals.

Openings 5a are formed through a relevant outer wall of the housing body 5, and retaining portions 7a, formed at a distal end of the double-retaining member 7, can project through the respective openings 5a into the respective terminal receiving holes 2.

Figure 3:
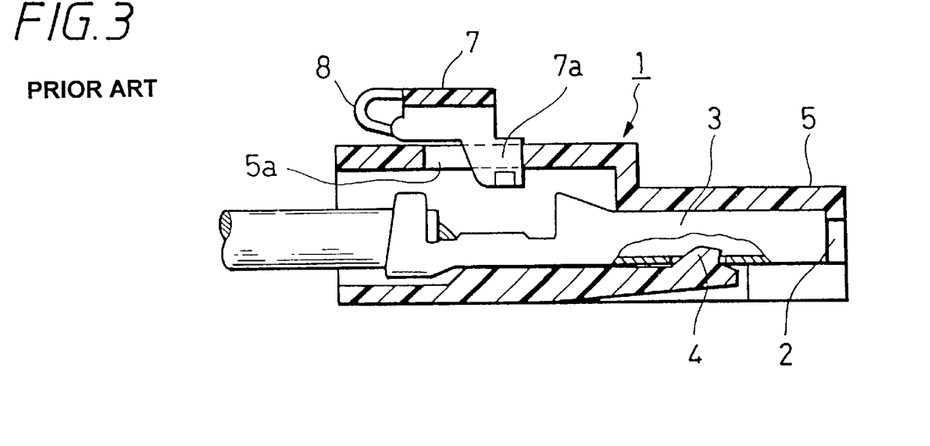
FIG. 3 is a vertical cross-sectional view of the double-retaining connector of FIG. 1 in a provisionally-fixed condition before the double-retaining is effected.

In this double-retaining connector 1, the retaining portions 7a of the double-retaining member 7 are provisionally fixed respectively to the openings 5a in the housing body 5 as shown in FIG. 3, and in this condition, the connection terminals 3 are inserted respectively into the terminal receiving holes 2. Then, as shown in FIG. 4, after the elastic retaining piece portions 4, provided respectively in the terminal receiving holes 2, are engaged respectively with the inserted connection terminals 3, the double-retaining member 7 is further pushed into the housing body 5 to be completely fixed to the housing body 5.

In this completely-fixed condition, the retaining portions 7a of the double-retaining member 7 prevent the connection terminals 3 from rising, thereby locking the retaining condition by the elastic retaining piece portions 4.

Figure 4:
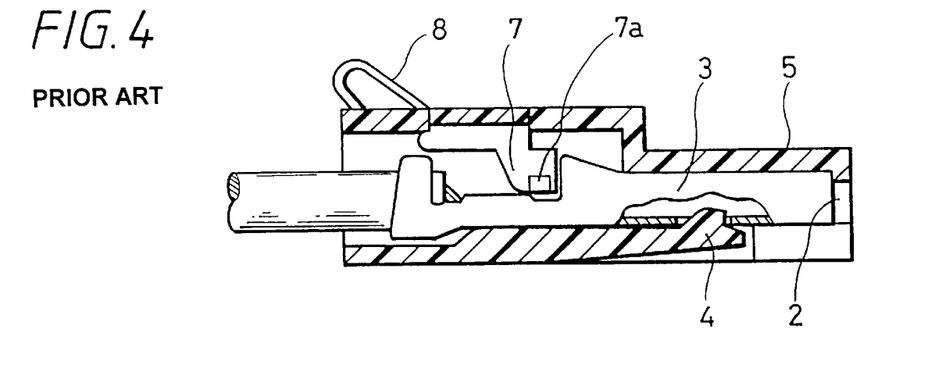
FIG. 4 is a vertical cross-sectional view of the double-retaining connector of FIG. 1 in a double-retained condition.

In the double-retaining connector 1, the double-retaining member 7 can be molded integrally with the housing body 5 through the flexible hinge bands 8 interconnecting the two members, and the double-retaining member 7 can be freely shifted into the provisionally-fixed condition of FIG. 3 and the completely-fixed condition of FIG. 4.

However, the hinge bands 8 are highly flexible, and therefore have a small force to limit the direction of movement of the double-retaining member 7, and when shifting the double-retaining member 7 into the provisionally-fixed condition of FIG. 3 or the completely-fixed condition of FIG. 4, the operator must suitably control a manipulation force to shift the double-retaining member 7 with the fingers, and therefore there has been encountered a problem that the efficiency of the assembling operation is low.

In addition, when shifting the double-retaining member 7 into the provisionally-fixed condition of FIG. 3 or the completely-fixed condition of FIG. 4, the manipulation force must be controlled so that the double-retaining member 7 can move in a predetermined direction and into a predetermined position, and therefore there is encountered a problem that an automatic assembling operation can not be achieved.

Figure 5:
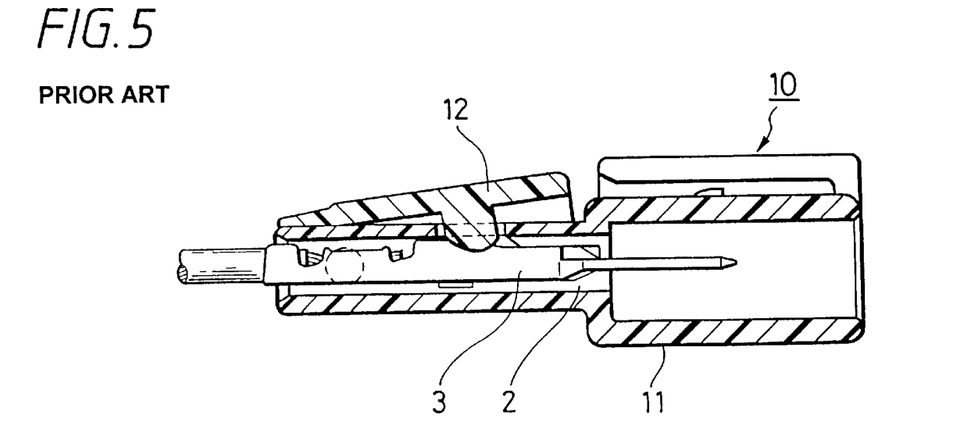
FIG. 5 is a vertical cross-sectional view of another conventional double-retaining connector in a provisionally-fixed condition before the double retaining is effected.
Figure 6:
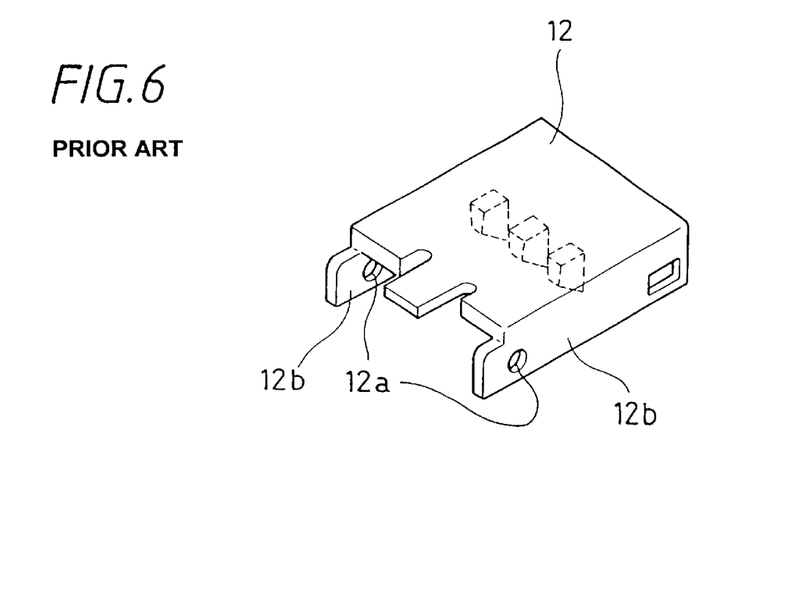
FIG. 6 is a perspective view of a double-retaining member for the conventional double-retaining connector of FIG. 5.
Figure 7:
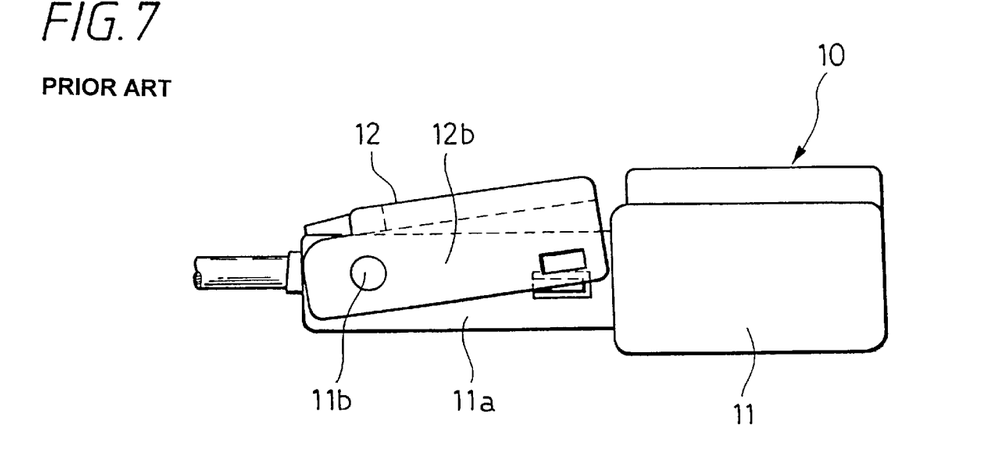
FIG. 7 is a side-elevational view showing the conventional double-retaining connector of FIG. 5 in the provisionally-fixed condition before the double-retaining is effected.

Under the circumstances, there has recently been proposed a double-retaining connector 10 shown in FIGS. 5 to 7.

This double-retaining connector 10 is disclosed in Japanese Patent Unexamined Publication No. Hei. 7-312255, and a housing body 11 made of a resin has terminal receiving holes 2, and engagement pins 11b are provided respectively at opposed right and left outer walls 11a of the housing body 11, and project away from each other.

As shown in FIG. 6, a double-retaining member 12 for retaining connection terminals 3, received respectively in the terminal receiving holes 2, in a double manner has fitting holes 12a (which are fitted respectively on the engagement pins 11a) formed respectively through oppose right and left outer walls 12b thereof, and the double-retaining member 12 is pivotally connected to the housing body 11 by the engagement pins 11b fitted respectively in the fitting holes 12a.

With this construction in which the housing body 11 and the double-retaining member 12 are connected together by the pins, the direction (path) of movement of the double-retaining member 12 can be limited to a predetermined direction when provisionally or completely fixing the double-retaining member 12 to the housing body 11, and therefore it is not necessary to carefully control a manipulation force to move the double-retaining member 12.

Therefore, after the housing body 11 and the double-retaining member 12 are connected together by the engagement pins 11b, the assembling operation thereafter is very easy, and this alleviates the burden on the operator, and besides the assembling operation can be effected automatically.

In the above double-retaining connector 10, however, when the engagement pins 11b of the housing body 11 are to be fitted respectively into the fitting holes 12a in the double-retaining member 12, those portions of the outer walls 12b, having the fitting holes 12a, must be forcibly urged or moved away from each other, and therefore there has been encountered a problem that considerable time and labor are required for connecting the housing body 11 and the double-retaining member 12 together.

In addition, the outer walls 12b of the double-retaining member 12 must be forcibly deformed elastically when fitting the engagement pins 11b respectively into the fitting holes 12a formed respectively through the outer walls 12b, and therefore the length of projection of the engagement pins 11b cannot be made long, and the depth of fitting of each engagement pin 11b in the fitting hole 12a is small. Therefore, if the outer wall 12b is warped outwardly by a strain after the molding, this fitting engagement can be easily released, and therefore there has been encountered a problem that the strength of connection between the housing body 11 and the double-retaining member 12 cannot be increased.

SUMMARY OF THE INVENTION

It is therefore an object of this invention to overcome the above problems, and more specifically to provide a method of producing a resin-molded assembly or a double-retaining connector in which resin-molded products are connected together by pins, and the products can be molded integrally with each other in such an assembled condition that these molded products are connected together by the pins, and therefore the need for an assembling operation of the resin-molded products connected together by the pins is obviated, and also a molding process is shortened so as to reduce the production cost.

The above object has been achieved by a method of producing a resin-molded assembly including a first molded product having engagement pins which are formed respectively on opposite wall surfaces thereof and coaxially projected away from each other, and a second molded product having fitting holes which are formed respectively in opposed walls thereof and are respectively engaged with the engagement pins in such a manner that the second molded project is pivotally or slidably connected to the first molded product by coupling the engagement pins with the fitting holes respectively, the method comprising the steps of:

selecting resin materials used respectively for the molded products in such a manner that a shrinkage coefficient of the first molded product can be higher than that of the second molded product; and multicolor molding the first and second molded products integrally with each other in an assembled condition so that the first molded product is detachable from the second molded product by elastically deforming at least one of the opposed walls of the second molded product and the opposite walls surfaces of said first molded product to thereby clear the fitting holes from the engagement pins.

The above object has been achieved also by a method of producing a double-retaining connector including:

a resin housing body comprising; terminal-receiving chambers into which terminals connected respectively to ends of wires are inserted, terminal retaining members provided in the terminal receiving chambers for retaining the connection between the terminals and the terminal receiving chambers, and engagement pins which are formed respectively on opposite outer wall surfaces of the housing body and coaxially projected away from each other; and a resin double-retaining member for locking the retained condition by the terminal retaining members, the double-retaining member having fitting holes which are formed respectively in opposed walls thereof and are fitted respectively on the engagement pins in such a manner that the double-retaining member is pivotally or slidably connected to the housing body by the engagement pins fitted respectively in the fitting holes;

the method comprising the steps of:

selecting resin materials used respectively for the molded products in such a manner that a shrinkage coefficient of the housing body can be higher than that of the double-retaining member; and multicolor molding the housing body and the double-retaining member integrally with each other in an assembled condition such that the double-retaining member is detachable from the housing body by elastically deforming one of the opposed walls of the double-retaining member and the opposite outer wall surfaces of the housing body to thereby clear the fitting holes from the engagement pins.

Further, the above object has been achieved also by a method of producing a resin-molded assembly including a first resin molded product having engagement pins which are coaxially extended with each other and a second resin molded product having fitting holes into which the engagement pins are respectively inserted in such a manner that the first resin molded product is moved relative to the second resin molded product through engagements between the engagement pins and the fitting holes, the method comprising the steps of:

injecting a second resin into a second molding cavity a shape of which is coincided with the second resin molded product having the fitting holes; and injecting a first resin, having a shrinkage coefficient higher than that of the second resin, into a second molding cavity a shape of which is coincided with the first resin molded product having the engagement pins, wherein the second molding cavity is defined in combination with a portion containing the fitting hole of the second molding product. The foregoing method is preferably carried out such that the first molded product of the resin molded assembly is detachable from the second molded product by elastically deforming least one of the opposed walls of the second molded product and the opposite outer walls surfaces of the first molded product to thereby clear the fitting holes from the engagement pins.

In the above-mentioned method of producing a resin-molded assembly, it is preferable that the first resin molded product includes a resin housing body which comprises terminal receiving chambers into which terminals connected respectively to ends of wires are inserted, terminal retaining members provided in the terminal receiving chambers for retaining the connection between the terminals and the terminal receiving chambers, and the engagement pins which are formed respectively on opposite outer wall surfaces of the housing body and coaxially projected away from each other; and that the second resin molded product includes a resin double-retaining member for locking the retained condition by the terminal retaining members, the double-retaining member having the fitting holes which are formed respectively in opposed walls thereof and are fitted respectively on the engagement pins in such a manner that the double-retaining member is pivotally or slidably connected to the housing body by the engagement pins fitted respectively in the fitting holes.

In the method of producing the resin-molded assembly and the method of producing the double-retaining connector according to the present invention, the resin-molded products are molded integrally with each other in the assembled condition by the multicolor molding method in such a form that the two molded products are connected together by the pins. At this time, the resin materials of different shrinkage coefficients are used respectively for the molded products so that the resin-molded product, having the pins, can shrink in a larger amount, and therefore the outer peripheral surface of each engagement pin and the inner peripheral surface of the associated fitting hole, which are in contact with each other at the time of the molding, will not adhere to each other.

Therefore, the relative pivotal movement or the relative sliding movement between the molded products will not be affected, and when the molding process is finished, there is obtained the resin-molded assembly or the double-retaining connector in its assembled condition in which the connection between the molded products by the pins has been completed.

Therefore, any cumbersome assembling operation, such as the operation of connection between the molded products by the pins, is not necessary, and besides a plurality of products can be molded at a time, thus shortening the molding process, and therefore the production cost of the resin-molded assembly or the double-retaining connector can be reduced.

DESCRIPTION OF THE PREFERRED EMBODIMENT

One preferred embodiment of a method of producing a resin-molded assembly of the invention, as well as one preferred embodiment of a method of producing a double-retaining connector of the invention, will now be described in detail with reference to FIGS. 8 to 13 by way of the method of producing the double-retaining connector.

Figure 8:
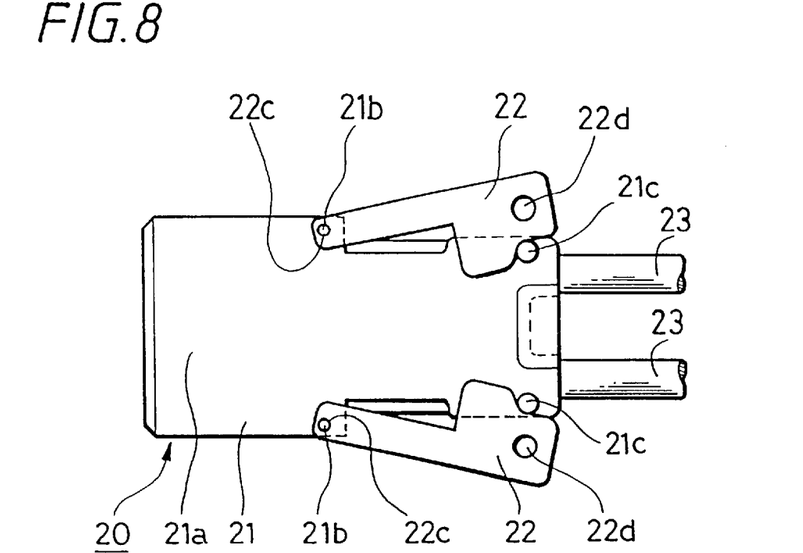
FIG. 8 is a side-elevational view showing double-retaining members in a provisionally-fixed condition in one preferred embodiment of a double-retaining connector production method of the invention.
Figure 9:
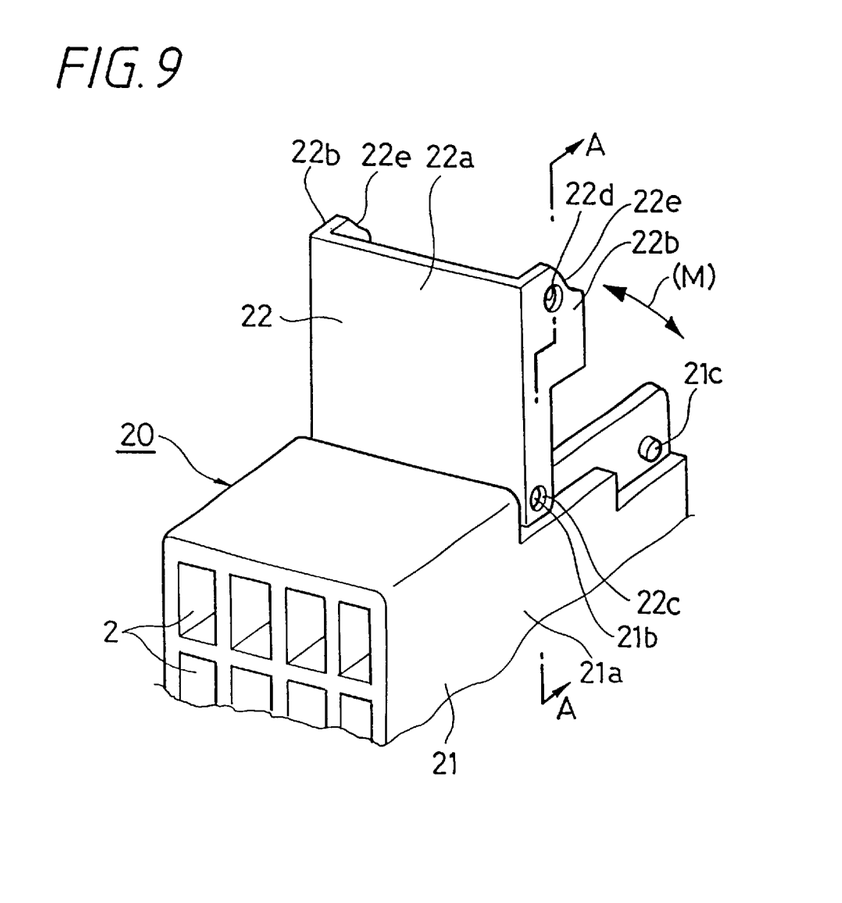
FIG. 9 is a perspective view showing the form of double-retaining connector produced by a multicolor molding method of the invention.
Figure 10:
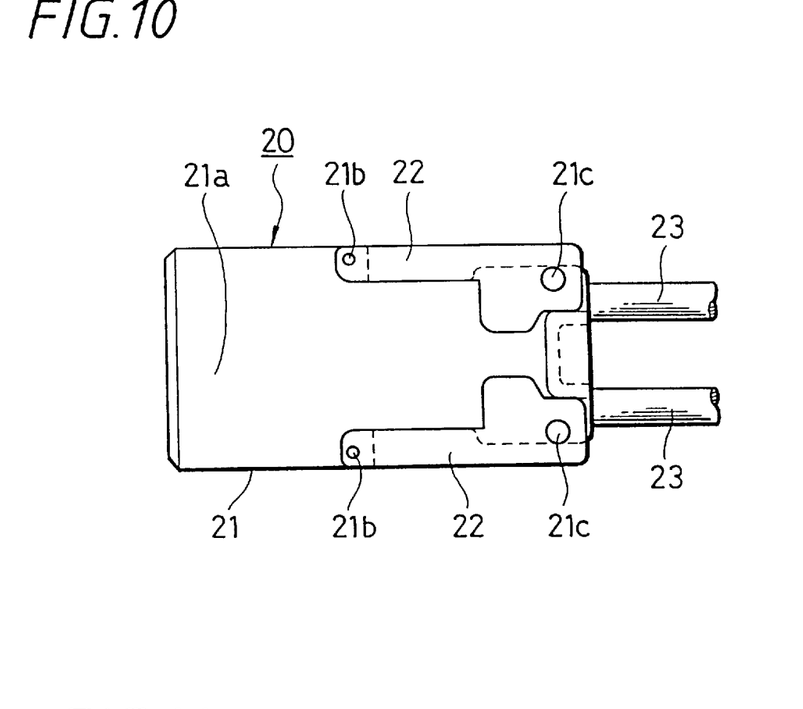
FIG. 10 is a side-elevational view showing the double-retaining members in a completely-fixed condition, which is produced by the double-retaining connector production method of the invention.
Figure 11:
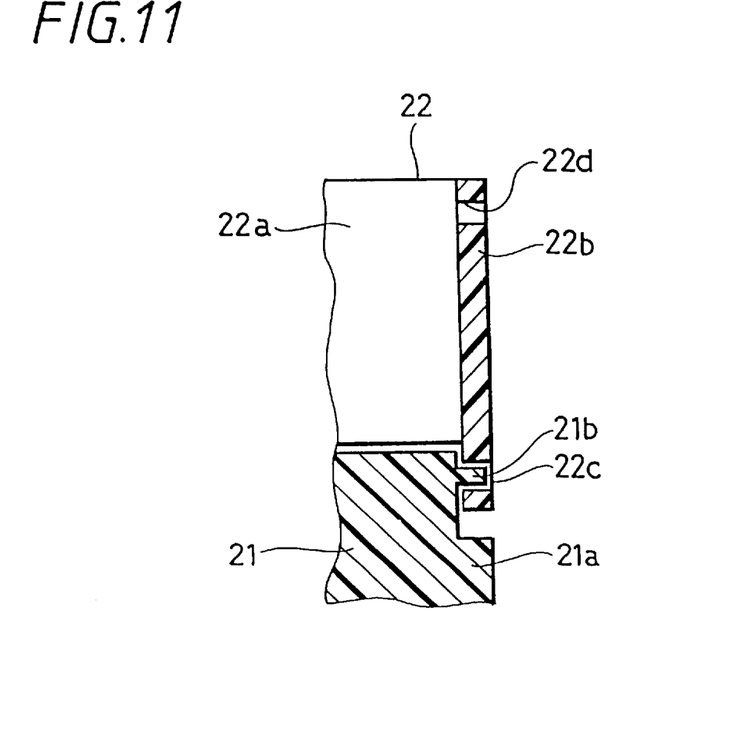
FIG. 11 is a cross-sectional view taken along the line XI—XI of FIG. 9.

FIG. 8 is a side-elevational view showing double-retaining members in a provisionally-fixed condition in the double-retaining connector production method of the invention, FIG. 9 is a perspective view showing a multicolor molded form in the double-retaining connector production method of the invention, FIG. 10 is a side-elevational view showing the double-retaining members of FIG. 8 in a completely-fixed condition, and FIG. 11 is a cross-sectional view taken along the line XI—XI of FIG. 9.

Figure 12:
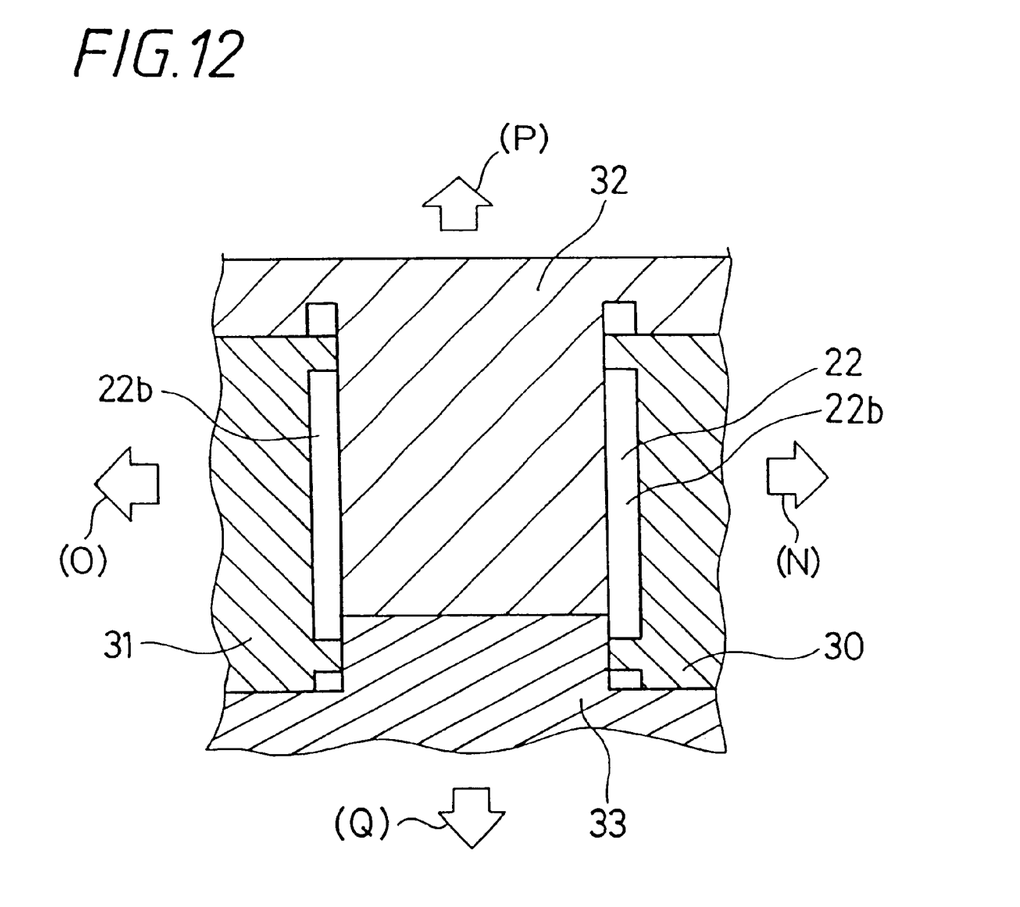
FIG. 12 is a view explanatory of a mold construction used when molding the double-retaining member in the double-retaining connector production method of the invention.
Figure 13:
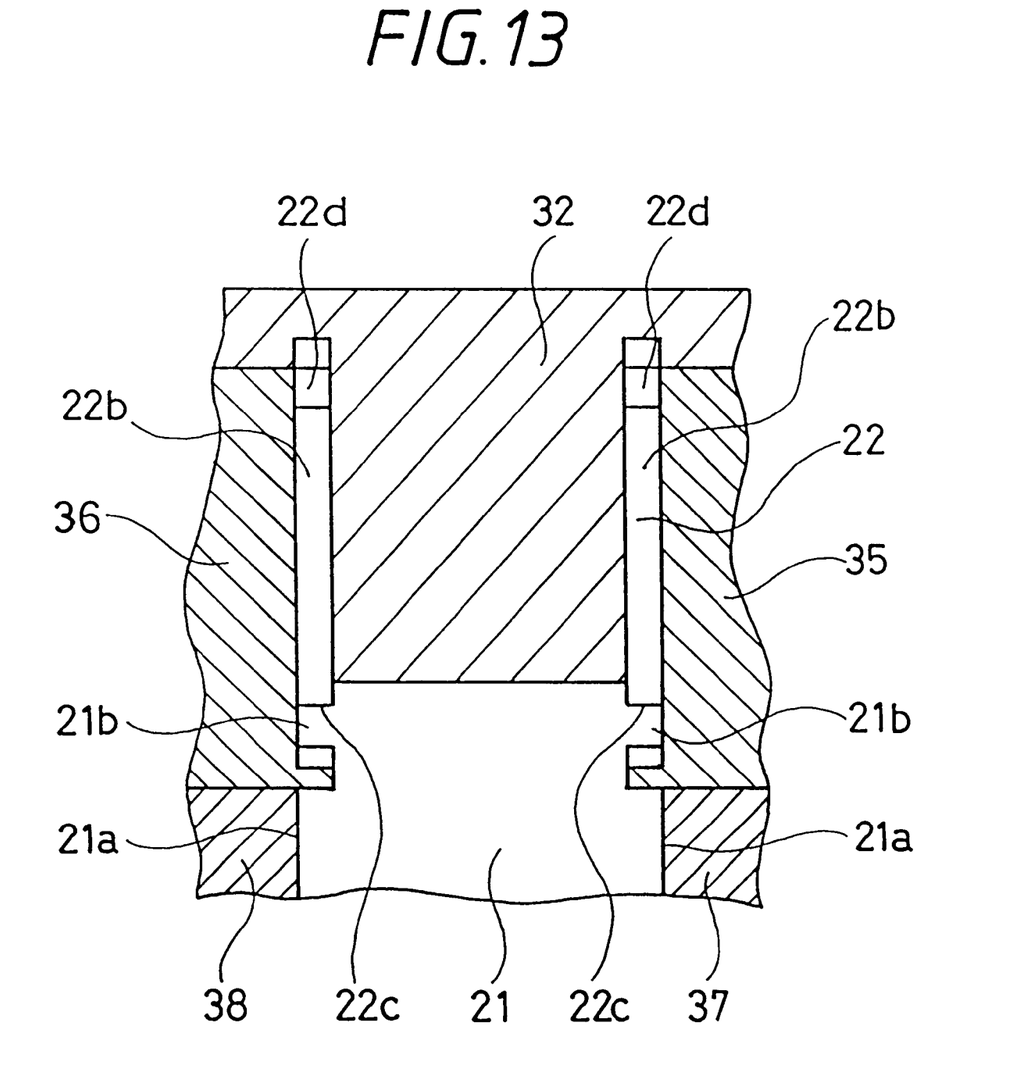
FIG. 13 is a view explanatory of a mold construction used when forming a housing body in the double-retaining connector production method of the invention.

FIGS. 12 and 13 are cross-sectional views of important portions of mold constructions used for producing the double-retaining connector of this embodiment, and FIG. 12 is a view explanatory of the mold construction used when molding the double-retaining member, and FIG. 13 is a view explanatory of the mold construction used when forming a housing body.

The construction of the double-retaining connector of this embodiment will first be described, and then the method of producing this double-retaining connector 20 will be described.

The double-retaining connector 20 of this embodiment comprises the housing body 21 of a resin having terminal receiving holes 2 arranged in two (upper and lower) rows, and the double-retaining members 22 of a resin connected by pins to the housing body 21 so that the double-retaining members 22 retain connection terminals, received respectively in the terminal receiving holes 2, in a double (or redundant) manner.

Terminal retaining means (lances) (not shown) for respectively retaining the connection terminals inserted respectively in the terminal receiving holes 2 are formed respectively in the terminal receiving holes 2. Part of each of upper and lower walls of the housing body 21 is removed so that rear end portions of the connection terminals, inserted respectively into the terminal receiving holes 2, can be exposed. The double-retaining members 22 are provided respectively at these removed portions of the upper and lower walls of the housing body 21.

The housing body 21 has engagement pins 21b and 21c formed on each of opposite right and left outer wall surfaces 21a thereof, the pins 21b and 21c projecting outwardly from the outer wall surface 21a. In accordance with the two (upper and lower) double-retaining members 22, the engagement pins 21b, as well as the engagement pins 21c, are formed respectively on upper and lower portions of each of the right and left outer wall surfaces 21a.

The engagement pins 21b and 21c are spaced from each other in a front-rear direction of the housing body 21. The engagement pins 21b, disposed at a generally central portion of the housing body 21, pivotally connect the double-retaining member 22 to the housing body 21. The engagement pins 21c, disposed at the end portion of the housing body 21, serve to fix the double-retaining member 22 in a double-locked position (completely-fixed position).

As shown in FIG. 9, the double-retaining member 22 includes a top plate portion 22a for covering the removed portion of the upper (lower) wall of the housing body 21, and opposed right and left outer walls 22b perpendicularly formed respectively at opposite sides of the top plate 22a. Double-retaining projections (not shown) are formed on an inner surface of the top plate 22a.

As shown in FIGS. 9 and 11, fitting holes 22c are formed respectively through the right and left is side walls 22b, and are fitted respectively on the engagement pins 21b, and fitting holes 22d are formed respectively through the right and left side walls 22b, and can be fitted respectively on the engagement pins 21c.

The engagement pins 21b are thus fitted respectively in the fitting holes 22c, and therefore the double-retaining member 22 is connected to the housing body 21 in such a manner that the double-retaining member 22 can be pivotally moved about the engagement pins 21b as indicated by arrow M in FIG. 9.

As shown in FIG. 9, provisionally-retaining step portions 22e for abutting respectively against the engagement pins 21c of the housing body 21 are formed respectively at front ends of the right and left outer walls 22b of the double-retaining member 22. When the double-retaining member 22 is pivotally moved in a closing direction as shown in FIG. 8, the provisionally-retaining step portions 22e abut respectively against the engagement pins 21c to provisionally fix the double-retaining member 22 in such a position that the double-retaining is projections on the double-retaining member 22 will not prevent the insertion of the connection terminals.

In the provisionally-fixed condition of FIG. 8, when the double-retaining member 22 is further pressed, the front end portions of the outer walls 22b are urged or moved away from each other, so that the engagement pins 21c are fitted respectively into the fitting holes 22d as shown in FIG. 10, thus bringing the double-retaining member 22 into the completely-fixed condition.

In the condition of FIG. 10, the double-retaining projections, formed on the double-retaining member 22, lock the retained condition of the connection terminals received respectively in the terminal receiving holes 2.

The above double-retaining connector 20 is integrally molded by a molding method in such a form that the double-retaining member 22 is disposed in a substantially fully-opened condition relative to the housing body 21 as shown in FIG. 9. First, the double-retaining member 22 is molded, using the mold construction shown in FIG. 12, and then the housing body 21 is molded after changing part of the mold construction as shown in FIG. 13.

Among molds used for molding the double-retaining member 22, the outer surface-forming molds 30 and 31 for forming the outer surfaces of the outer walls 22b of the double-retaining member 22, the fitting holes 22c and the fitting holes 22d can be moved laterally outwardly as indicated by arrows N and 0.

The front end portion-forming mold 32 for forming the front end surface and inner surfaces of the double-retaining member 22 can be moved forwardly as indicated by arrow P.

The rear end portion-forming mold 33 for forming the rear end surface and inner surfaces of the double-retaining member 22 can be moved rearwardly as indicated by arrow Q.

When a resin material for the housing body 21 is to be injected after the injection of a resin material for the double-retaining member 22 is finished, the outer surface-forming molds 30 and 31 are exchanged with outer surface-forming molds 35 and 36, and the rear end portion-forming mold 33 is exchanged with housing side portion-forming molds 37 and 38.

In this embodiment, in the continuous molding of the double-retaining member 22 and the housing body 21, the resin materials, used respectively for the molded products, are so selected that a shrinkage coefficient (shrinkage percentage) of the housing body 21 can be higher than that of the double-retaining member 22.

In one preferred embodiment, poly butylene terephthalate ("PBT") and polyamido ("PA") are used as resin materials for the connectors. In another preferred embodiment, material with glass reinforcement and material without glass reinforcement, each having different shrinkage coefficients, may be used to make the connector in accordance with the present invention.

For example, the shrinkage coefficient of a resin material reinforced with glass is 3/1000, while that of a resin without glass reinforcement is 18/1000. It should also be noted that these shrinkage coefficients are applicable for PBT and PA.

Therefore, the above double-retaining connector 20 is integrally molded by a multicolor molding method in such a form that the housing body 21 and the double-retaining member 22 are connected together by the pins. At this time, since the resin materials of different shrinkage coefficients are used respectively for the molded products so that the housing body 21, having the pins 21b and 21c, can shrink in a larger amount, the outer peripheral surface of each engagement pin 21b and the inner peripheral surface of the associated fitting hole 22c, which are in contact with each other at the time of the molding, will not adhere to each other.

Therefore, the pivotal movement of the pin-connected, double-retaining member 22 will not be affected, and when the molding process is finished, there is obtained the double-retaining connector 20 in the assembled condition in which the connection between the housing body 21 and the double-retaining member 22 by the pins has been completed.

Therefore, any cumbersome assembling operation, such as the operation of connection between the housing body 21 and the double-retaining member 22 by the pins, is not necessary, and besides a plurality of products can be molded at a time, thus shortening the molding process, and therefore the production cost of the double-retaining connectors 20 can be reduced.

Furthermore, an operation for forcibly elastically deforming one of the members so as to fit the engagement pins 21b into the respective fitting holes 22c is not necessary, and therefore the length of projection of the engagement pins 21b can be increased, thus increasing the depth of fitting of each engagement pin-21b in the associated fitting hole 22c, and the strength of connection between the housing body 21 and the double-retaining member 22 by the pins can be increased.

The double retaining connector can also be molded with shorter pin lengths so that the member 22 can be readily separated (i.e., detached) from the connector housing body 21 by elastically deforming either (or both) the opposed walls of the double retaining member or the opposite wall surfaces of the connector housing body so as to clear the fitting holes 22c from the engagement pins 21b. In a preferred embodiment, the length of the engagement pins are between 0.5 mm and 2 mm. A connector which can be readily separable in this manner can facilitate maintenance which is often required after insertion of the terminals in the connector.

Accordingly, a connector manufactured in accordance with the present invention in which the double-retaining member is readily detachable from the housing body eliminates the step of assembling the two components during manufacturing while still permitting their separation for maintenance during use of the connector.

The above multicolor molding method, in which the resin material for forming the molded project having the engagement pins is higher in shrinkage coefficient than the resin material for forming the molded product having the fitting holes, is not limited to the production of the above double-retaining connector, but can be applied to various products.

The relative movement between the molded products by the fitting of the engagement pins in the respective fitting engagement pin in the associated fitting hole, and the strength of connection between the molded products by the pins can be increased.

While there has been described in connection with the preferred embodiments of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A method of producing a resin-molded assembly including a first molded product having engagement pins which are formed respectively on opposite wall surfaces thereof and coaxially projected away from each other, and a second molded product having fitting holes which are formed respectively in opposed walls thereof and are respectively engaged with said engagement pins in such a manner that said second molded product is pivotally or slidably connected to said first molded product by coupling said engagement pins with said fitting holes respectively, said method comprising the steps of:

selecting resin materials used respectively for said molded products in such a manner that a shrinkage coefficient of said first molded product is higher than that of said second molded product; and molding said first and second molded products integrally with each other in an assembled condition such that said first molded product is detachable from said second molded product by elastically deforming at least one of said opposed walls of said second molded product and said opposite wall surfaces of said first molded product to thereby clear said fitting holes from said engagement pins.

2. A method of producing a double-retaining connector including:

a resin housing body comprising: terminal receiving chambers into which terminals connected respectively to ends of wires are inserted, terminal retaining members provided in said terminal receiving chambers for retaining a connection between the terminals and said terminal receiving chambers, thereby defining a retained condition, and engagement pins which are formed respectively on opposite outer wall surfaces of said housing body and coaxially projected away from each other; and a resin double-retaining member for locking the retained condition by said terminal retaining members, said double-retaining member having fitting holes which are formed respectively in opposed walls thereof and are fitted respectively on said engagement pins in such a manner that said double-retaining member is pivotally or slidably connected to said housing body by said engagement pins fitted respectively in said fitting holes; said method comprising the steps of:

selecting resin materials used respectively for said molded products in such a manner that a shrinkage coefficient of said housing body is higher than that of said double-retaining member; and molding said housing body and said double-retaining member integrally with each other in an assembled condition such that said double-retaining member is detachable from said housing body by elastically deforming at least one of said opposed walls of said double-retaining member and said opposite outer wall surfaces of said housing body to thereby clear said fitting holes from said engagement pins.

3. A method of producing a resin-molded assembly including:

a first resin molded product comprising a resin housing body which comprises terminal receiving chambers into which terminals connected respectively to ends of wires are inserted, terminal retaining members provided in said terminal receiving chambers for retaining a connection between the terminals and said terminal receiving chambers, thereby defining a retained condition, and engagement pins which are formed respectively on opposite outer wall surfaces of said housing body and which are coaxially projected away from each other; and a second resin molded product comprising a resin double-retaining member for locking the retained condition by said terminal retaining members, said double-retaining member having fitting holes which are formed respectively in opposed walls thereof and are fitted respectively on said engagement pins in such a manner that said double-retaining member is one of pivotally and slidably connected to said housing body by said engagement pins fitted respectively in said fitting holes; said method comprising the steps of:

injecting a second resin into a second molding cavity a shape of which is coincided with said second resin molded product having the fitting holes; and injecting a first resin, having a shrinkage coefficient higher than that of said second resin, into a first molding cavity a shape of which is coincided with said first resin molded product having the engagement pins, wherein said first molding cavity is defined in combination with a portion containing said fitting hole of said second molding product; and such that said first molded product of said resin molded assembly is detachable from said second molded product by elastically deforming at least one of said opposed walls of said second molded product and said opposite outer walls surfaces of said first molded product to thereby clear said fitting holes from said engagement pins.

4. The method of producing a resin-molded assembly in accordance with claim 1, wherein said step of molding said first and second molded products integrally with each other includes making said first molded product a different color from said second molded product.

5. The method of producing a double-retaining connector in accordance with claim 2, wherein said step of molding said housing body and said double-retaining member integrally with each other includes making said housing body a different color from said double-retaining member.

6. A method of producing a resin-molded assembly including:

a first resin molded product having engagement pins which are coaxially extended with each other from opposed walls of said first resin molded product, and a second resin molded product having fitting holes in opposed walls of said second resin molded product and into which said engagement pins are respectively inserted in such a manner that said first resin molded product is moved relative to said second resin molded product through engagements between said engagement pins and said fitting holes, said method comprising the steps of:

injecting a second resin into a second molding cavity a shape of which is coincided with said second resin molded product having the fitting holes; and injecting a first resin, having a shrinkage coefficient higher than that of said second resin, into a first molding cavity a shape of which is coincided with said first resin molded product having the engagement pins, wherein said first molding cavity is defined in combination with a portion containing said fitting hole of said second molding product, and such that said first molded product of said resin molded assembly is detachable from second molded product by elastically deforming at least one of said opposed walls of said second molded product and said opposed walls of said first molded product to thereby clear said fitting holes from said engagement pins.

7. The method of producing a resin-molded assembly in accordance with claim 1, wherein said step of selecting resin materials includes selecting at least one of a poly butylene terephthalate resin and a polyamido resin.

8. The method of producing a resin-molded assembly in accordance with claim 1, wherein said step of selecting resin materials includes selecting a resin material without glass reinforcement for the first molded product and a resin material with glass reinforcement for the second molded product.

9. The method of producing a resin-molded assembly in accordance with claim 1, wherein said engagement pins are molded to have a length of between 0.5 mm and 2 mm.

10. The method of producing a double-retaining connector in accordance with claim 2, wherein said step of selecting resin materials includes selecting at least one of a poly butylene terephthalate resin and a polyamido resin.

11. The method of producing a double-retaining connector in accordance with claim 2, wherein said step of selecting resin materials includes selecting a resin material without glass reinforcement for the housing body and a resin material with glass reinforcement for the double-retaining member.

12. The method of producing a double-retaining connector in accordance with claim 2, wherein said engagement pins are molded to have a length of between 0.5 mm and 2 mm.

13. The method of producing a resin-molded assembly in accordance with claim 3, wherein said first resin is one of a poly butylene terephthalate resin and a polyamido resin, and said second resin is one of the poly butylene terephthalate resin and the polyamido resin.

14. The method of producing a resin-molded assembly in accordance with claim 3, wherein said first resin is a resin without glass reinforcement, and said second resin is a resin with glass reinforcement.

15. The method of producing a resin-molded assembly in accordance with claim 3, wherein said engagement pins are molded to have a length of between 0.5 mm and 2 mm.

16. The method of producing a resin-molded assembly in accordance with claim 6, wherein said first resin is one of a poly butylene terephthalate resin and a polyamido resin, and said second resin is one of the poly butylene terephthalate resin and the polyamido resin.

17. The method of producing a resin-molded assembly in accordance with claim 6, wherein said first resin is a resin without glass reinforcement, and said second resin is a resin with glass reinforcement.

18. The method of producing a resin-molded assembly in accordance with claim 6, wherein said engagement pins are molded to have a length of between 0.5 mm and 2 mm.

* * * * *